Sept. 9, 1958 M. A. McCLAIN 2,851,292
LOCK NUT
Filed June 1, 1953

INVENTOR.
MELVIN A. McCLAIN
BY
J. E. Dickinson
HIS ATTORNEY

United States Patent Office 2,851,292
Patented Sept. 9, 1958

2,851,292
LOCK NUT

Melvin A. McClain, New Castle, Pa., assignor to United Engineering and Foundry Company, Pittsburgh, Pa., a corporation of Pennsylvania Application June 1, 1953, Serial No. 358,626

1 Claim. (Cl. 287—53)

This invention relates generally to a device for use in positively retaining two members in an engaged relationship and in particular to an arrangement employing a lock nut adapted to be firmly secured to the members and yet which may be readily removed for disassembly and used again on reassembly of the members.

Heretofore, various types of locking devices have been employed for locking together two or more members but the use of such devices has been objectionable either from the standpoint of the expense involved in the amount of accurate machining required or by reason of the fact that on disassembly of engaged members the locking device is either destroyed or damaged to such an extent that it may not be used again.

It is one of the objects of this invention to provide a lock nut arrangement in which the nut provides positive retention of two members in their engaged relationship and yet which may be readily removed for disengaging such members.

Another object of this invention is to provide a lock nut arrangement which has a minimum of critical dimensions hence requiring a minimum amount of accurate machining.

Still another object of this invention is to provide a lock nut arrangement in which the locking elements may be readily engaged and disengaged as desired.

Figure 1:
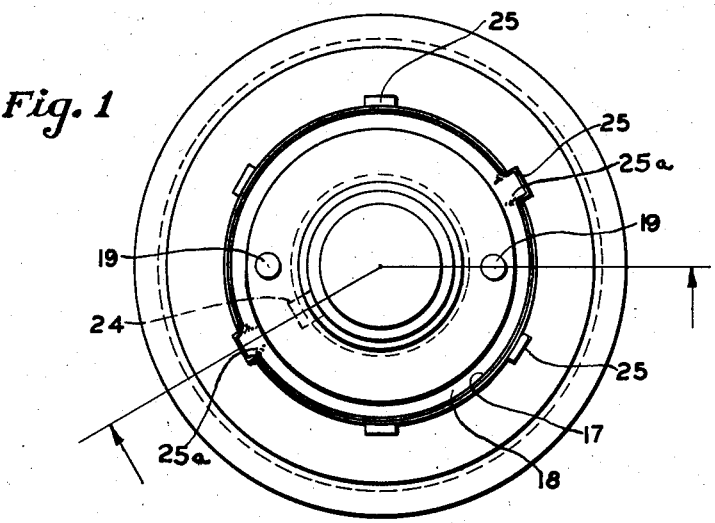
Figure 2:
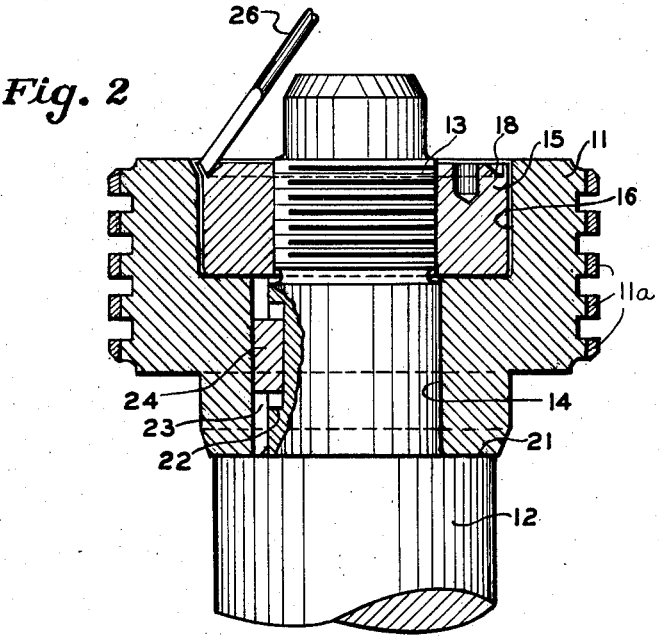

These objects, as well as the various other novel features and advantages of this invention, will be apparent from the specification and drawings of which:

Figure 1 is a plan view of a piston rod assembly employing a locking device embodying the features of the invention herein disclosed, and Figure 2 is a sectional view taken on the lines II—II of Figure 1.

With reference to the drawings, there is shown therein a piston 11 having a suitable coating 11a of bronze or the like on the outer surface thereof, a piston rod 12 having a threaded portion 13 which extends through an opening 14 in the bottom of the piston and upon which there is placed in threaded engagement a circular nut 15 received into a well 16 formed in the piston 11. The nut 15 is provided with a thin annular wall 17 at its outer edge which is formed by cutting out an annular groove 18 tapering from the inner edge to its deepest point at the wall. Two openings 19 are formed in the nut into which there may be inserted the two pins of a pin wrench, for example, for drawing up tight the nut upon the threaded rod so that the under side of the piston is pressed firmly against a shoulder 21 formed on the rod.

Intermediate the shoulder 21 and the inner end of the thread of rod 12 there is provided an axially extending keyway 22 and in the piston 11 a second keyway 23 into the two of which a key 24 extends for preventing the piston 11 and the rod 12 from turning relative to one another.

In Figure 1 there are shown a plurality of slots or grooves 25 arranged in diametrically opposite pairs, formed on the outer face of the piston 11 and extending into the wall of the well 16. It is to be appreciated, however, that although six such slots have been shown, any number may be provided and it is not necessary that they be arranged in any particular relationship with respect to one another to realize the advantages of this invention.

After the piston 11 and the piston rod 12 have been assembled and the nut 15 drawn up tight, which places the thin wall 16 of the nut opposite the slots 25, the nut is locked in position as shown in Figure 2 by striking a suitable tool 26 held against the wall area adjacent one of the slots thereby breaking away a portion of the wall and forcing the broken-away portion into the groove. Although two of the slots are illustrated as being employed for locking the nut, one alone may be used effectively. For maintenance purposes should it be necessary to remove the piston from the rod, the broken away wall portion is merely forced out of the slots and the nut readily removed. On reassembly of the elements the nut may be used again and locking effected by deforming the portion of the thin wall opposite any of the slots which have not been used for previously locking the nut in place.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

A disengageable locking device for preventing relative rotational movement of a piston and a cylindrical nut threadably secured to a piston rod, said piston having a stepped diameter axial opening extending therethrough and a plurality of slots terminating at the upper surface and extending through the wall of the axial opening thereof, said nut on assembly of said piston rod, piston and nut nesting within the axial opening of said piston thereby to engage a portion of the inner suface of said piston, said locking device comprising a thin deformable continuous wall having the same outer diameter as that of the nut and formed on the end of the nut last to pass upon said rod which on assembly of said rod, piston and nut is so positioned that a portion of the wall will be closely adjacent to each of said slots in said piston whereby on deformation of said wall portion in a direction toward said slots said deformed portion will extend into locking engagement with said slots thereby to prevent relative rotation between said piston and said nut.

References Cited in the file of this patent

UNITED STATES PATENTS

| 368,744 | Woodruff | Aug. 23, 1887 |
| 626,227 | Gaylor | June 6, 1899 |
| 889,894 | Berentsen | June 9, 1908 |
| 1,143,720 | Masury | June 22, 1915 |
| 1,196,565 | McDonald | Aug. 29, 1916 |
| 1,797,296 | Ray | Mar. 24, 1931 |
| 2,317,070 | LeTourneau | Apr. 20, 1943 |
| 2,419,849 | Morris | Apr. 29, 1947 |
| 2,448,902 | McKenzie | Sept. 7, 1948 |